US006487572B2

(12) United States Patent
Kamiya et al.

(10) Patent No.: US 6,487,572 B2
(45) **Date of Patent: *Nov. 26, 2002**

(54) DIGITAL FILTERING METHOD AND DEVICE AND SOUND IMAGE LOCALIZING DEVICE

(75) Inventors: Ryo Kamiya; Tomoaki Ando, both of Hamamatsu (JP)

(73) Assignee: Yahama Corporation, Hamamatsu (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,395

(22) Filed: Oct. 29, 1998

(65) Prior Publication Data

US 2002/0161808 A1 Oct. 31, 2002

(30) Foreign Application Priority Data

Oct. 31, 1997 (JP) ........................................ 9-301328

(51) Int. Cl.[7] .......................... G06F 17/17; G06F 17/10
(52) U.S. Cl. ....................................... 708/313; 708/316
(58) Field of Search ................................ 708/313, 316

(56) References Cited

U.S. PATENT DOCUMENTS 5,157,622 A * 10/1992 Makino et al. ............. 708/313
5,355,328 A * 10/1994 Arbeiter et al. ............. 708/313
5,594,677 A * 1/1997 Golla et al. ................. 708/313
6,125,155 A * 9/2000 Lesthievent et al. ........ 708/316
6,154,761 A * 11/2000 Kondo et al. ............... 708/316

* cited by examiner

*Primary Examiner*—Tan V. Mai
(74) *Attorney, Agent, or Firm*—Morrison & Foerster LLP

(57) ABSTRACT

A series of digital data to be filtered is divided into a plurality of frames, and f samples of the digital data of each of the frames are burst-transmitted via a computer bus. In transferring the digital data of any one of the frames, n samples of the digital data belonging to a next frame is transferred, along with the digital data of the one frame, to thereby transfer a time series of the digital data consisting of (f+n) samples that are more than the f samples contained in the one frame. Also, a set of k filter coefficients to be used for filtering arithmetic operations in the frame is burst-transmitted via the computer bus, where n≧k. Filtering arithmetic processor, such as a DSP, connected to the bus carries out filtering arithmetic processing using the transmitted f+n samples of the digital data and k coefficients, to provide filtered data corresponding to at least the number of samples for a single frame. The filtering arithmetic processing may itself be conducted at high speed asynchronously with a predetermined sampling cycle. Thus, the filtering arithmetic operations are performed intermittently on a frame-by-frame basis. By buffering the filtered data and outputting them with the predetermined sampling cycle, there are provided filtered outputs synchronous with the predetermined sampling cycle. Cross-fade synthesis (interpolation) between filtered data of adjoining frames can smoothly interconnect the filtered data of the frames.

20 Claims, 7 Drawing Sheets

DIGITAL FILTERING METHOD AND DEVICE AND SOUND IMAGE LOCALIZING DEVICE

BACKGROUND OF THE INVENTION

The present invention relates to an improved digital filtering method and device which permit efficient filtering processing where filtering arithmetic operations are executed every plurality of samples in an intermittent manner, and a sound image localizing device which, using the improved digital filtering method, can suitably impart a high-quality sound image localization effect to sound waveform data.

A variety of sound image localizing devices have been developed and marketed in recent years, to achieve sounds full of a sense of "presence". As a system intended for use in movies, music concerts and the like, the so-called "5.1 channel technique" has been standardized, according to which three-channel speakers are placed before listeners and two-channel speakers are placed behind the listeners and volumes and phases of sounds generated from each of the speakers are adjusted in accordance with movement of a sound source.

As another technique, the three-dimensional positioning system has been known, according to which a head-related transfer function (abbreviated "HRTF"), indicative of a sound transfer from a sound source to listener's left and right ears, is measured previously in association with possible coordinates of the sound source and a coefficient of the head-related transfer function (HRTF) is varied dynamically as the coordinates of the sound source changes. With this three-dimensional positioning system, the overall system organization can be greatly simplified because only two-channel speakers and amplifiers corresponding to the left and right ears are sufficient for sound generation purposes.

FIG. 6 is a functional block diagram of a typical example of the three-dimensional positioning system. In the illustrated example, the three-dimensional positioning system employs three sound sources SG1, SG2 and SG3 which generate waveform data W1, W2 and W3, respectively. The positioning system also includes finite impulse response (FIR) filters, and characteristics of each of these FIR filters F1 to F3 represents a head-related transfer function (HRTF) representative of a sound transfer from a sound source to listener's left and right ears. Here, as the sound sources SG1, SG2 and SG3 move imaginarily, respective coefficients of the FIR filters F1 to F3 are varied dynamically in accordance with the changing coordinates of the sound sources SG1, SG2 and SG3.

The positioning system of FIG. 6 further includes adders A1 and A2, which add together output data from the FIR filters F1 to F3 so as to provide waveform data for the left (L) and right (R) channels. Note that the waveform data are generated from the adders A1 and A2 in accordance with the head-related transfer functions (HRTFs) assuming that sounds from the sound sources SG1, SG2 and SG3 are input directly to the left and right ears. Thus, no particular problem would arise if sound generator means are placed very close to the listener's left and right ears and a sound from each of the sound generator means is listened to by only one of the two as in the case of headphones; however, if the left-and right-channel speakers are placed before the listener, then a sound from one of the speakers would reach both of the left and right ears, thereby causing unwanted crosstalk. Thus, a crosstalk processing section C is used in the illustrated example to generate left-channel waveform data DL and right-channel waveform data DR modified to cancel aural influences of the crosstalk. Note that whereas the operations up to those of the adders A1 and A2 are performed separately for each of the sounds, the crosstalk processing operations are performed collectively on all of the sounds.

Further, FIG. 7 is a block diagram showing a detailed construction of the FIR filter F1 employed in the system of FIG. 6. Assuming that the three-dimensional positioning system is provided within a personal computer, the FIR filter F1 is connected to a host driver (not shown) via a PCI (Peripheral Component Interconnect) bus unit or the like, and includes a DSP (Digital Signal Processor) 100 for performing arithmetic operations, such as multiplication and addition, a CPU 200 for controlling the DSP 100, a working memory 210 connected to the CPU 200 and an HRTF coefficient data memory 110 storing therein HRTF or head-related transfer function coefficient data. Thus, once a coordinates instruction P is given from the host driver via the bus unit to the FIR filter F1, the CPU 200, using the working memory 210, calculates an address indicating a storage region of HRTF coefficient data h corresponding to individual tap coefficients of the filter and sends the thus-calculated address to the DSP 100. Then, the DSP 100 reads out the HRTF coefficient data h from the HRTF coefficient data memory 110 and performs multiplication and addition operations between the HRTF coefficient data h and waveform data W1, so as to generate processed waveform data W1'.

Directional accuracy with which the sound source is to be localized depends on a data quantity of the HRTF coefficient data h. Therefore, for increased accuracy of sound image localization to achieve sounds full of a sense of presence, there has been a need to provide a great-capacity HRTF coefficient data memory 110 in the FIR filter F1. Further, because the conventional system has to interpret the coordinates instruction P given from the personal computer and thereby selectively read out the HRTF coefficient data h, there has been a need to provide the CPU 200 within the FIR filter F1 as a controller. Besides, because the host driver, in many cases, is provided with a CPU for controlling the overall operations of the personal computer and a great-capacity main memory, etc., the conventional system would encounter the problem that an overall size of electric circuitry in the FIR filter unavoidably increases and the circuit arrangements of the host driver can not be used effectively.

SUMMARY OF THE INVENTION

It is therefore an object of the present invention to provide a digital filtering method and device which are operable by being connected a computer bus and which achieve efficient digital filtering processing without increasing a size of electric circuitry employed.

It is another object of the present invention to provide a sound image localizing device which achieve high-quality sound image localization control without increasing a size of electric circuitry employed.

In order to accomplish the above-mentioned object, the present invention provides a digital filtering method which comprises: a first step of collectively transferring, via a bus of a computer, a plurality of samples of digital data to be filtered; a second step of executing filtering processing, based on a predetermined filter function, on the plurality of samples of digital data transferred by the first step, at a processing rate higher than a predetermined sampling rate; and a third step of buffering the digital data having been subjected to the filtering processing by the second step and then outputting, at the predetermined sampling rate, the digital data buffered thereby.

Because of the arrangement that a plurality of samples of digital data to be filtered are transferred collectively via the computer bus, it is possible to eliminate a need for the computer to send out the digital data in synchronism with a predetermined sampling cycle, and thus the digital data transfer is not substantially bound by time. As a consequence, the computer and bus can be used efficiently for any other purpose. Further, because the filtering processing by the second step carries out filtering arithmetic operations based on a predetermined filter function at a rate higher than a predetermined sampling rate, the filtering arithmetic operations, in an exemplary case where f samples of the digital data are to be filtered, can be conducted promptly without taking a time that would be normally required for filtering of the f samples. Via the bus, the first step can transfer individual blocks, each comprising a plurality of samples of the digital data, intermittently on a block-by-block basis, i.e., one block at a time. In response to the intermittent transfer of the blocks, the second step can execute the filtering arithmetic processing on the transferred blocks intermittently on the block-by-block basis. In the following third step, the data having been subjected to the filtering arithmetic processing by the second step are sequentially buffered and then output at the predetermined sampling rate, to provide normal filtered output data according to the predetermined sampling rate or cycle.

By virtue of the intermitted filtering arithmetic operations, the second step can perform the filtering processing for not only one channel but also a plurality of channels, by making efficient use of vacant time in the individual channels. Thus, the filtering arithmetic processing can be performed independently for each of the many channels, without increasing a size of electric circuitry employed.

In a preferred implementation, the first step divides a series of the digital data to be filtered into a plurality of data sections and intermittently transfers digital data blocks each comprising a plurality of samples (e.g., f samples) of the digital data belonging to one of the data sections, and when transferring the digital data belonging to any one of the data sections, the first step transfers, along with the digital data belonging to the one data section, part (e.g., n sample) of the digital data belonging to another of the data sections adjoining the one data section, to thereby transfer a time series of the digital data consisting of a greater number of samples (f+n samples) than a total number of samples (f samples) contained in the one data section. In response to the digital data transfer, the second step executes the filtering processing based on the predetermined filter function using that time series of the digital data consisting of a greater number of samples than a total number of samples contained in the one data section, to thereby provide filtered data corresponding to at least the total number of samples (f samples) contained in the one data section.

In this way, intermittent filtering arithmetic processing can be carried out effectively. Namely, assuming that a coefficient set to be used for the filtering arithmetic processing consists of a total of k filter coefficients, filtering arithmetic processing with k−1 unit time delays, i.e., (k−1)-order filtering arithmetic processing is executed and one sample of filtered data is provided through multiplying and adding operations for the k coefficients. To provide filtered data for f samples, at least f+k samples should be input as the time-serial digital data to be filtered. However, by setting the number of the samples to be transferred redundantly (i.e., n samples) to be equivalent to or greater than the number of the coefficients k (i.e., n≧k), it is possible to possible to provide filtered data corresponding to the total number of samples (f samples) contained in a single data section. The samples of the adjoining data section transferred redundantly are used when the filtering arithmetic processing is performed on the adjoining or next data section. For that purpose, the redundant samples are preferably retransferred at the data transfer stage of the first step with respect to the next data section, although they may be stored by the second step in readiness for the filtering arithmetic processing. While storing the redundant samples at the filtering processing stage of the second step may increase the size of the electric circuitry to some degree, retransferring the redundant samples in the first step is advantageous in that it can be done simply without requiring an additional register.

In a preferred implementation, a predetermined number of interpolating samples (e.g., j samples ) of digital data may further be included as the part of the digital data belonging to the other data section. Thus, the second step provides the filtered data consisting of a sum of the total number of samples contained in the one data section and the predetermined number of interpolating samples (e.g., f+j samples). In this case, the filtering method further comprises a fourth step of buffering, for the data section, a part of the filtered data that corresponds to the predetermined number of interpolating samples (j samples), and a fifth step of executing a predetermined interpolating process using the part of the filtered data that is buffered by the fourth step in the preceding data section and another part of the filtered data that corresponds to the total number of samples (f samples) contained in the current data sections.

This way, with respect to the redundant or duplicated j samples, interpolation is carried out between results of the filtering arithmetic processing based on the filter coefficients used in the preceding data section and results of the filtering arithmetic processing based on the filter coefficients used in the current data section, so as to provide j data as a result of the interpolation. These j interpolated data are output, along with k−j filtered data, by the third step as a total of k samples of filtered and interpolated data. With this arrangement, even when the coefficient sets used in the filtering arithmetic processing for the preceding data section and the current data section are different in content (i.e., even when the filter coefficients have varied over time), the filtered data for the two data sections can be interconnected smoothly through the interpolation.

In a preferred implementation, the first step also transfers, via the bus, a set of coefficients to be used in the filtering processing, and the second step executes the filtering processing using the set of coefficients transferred by the first step. This arrangement eliminates a need to provide a memory for prestoring a plurality of sets of filter coefficients in association with the second step, i.e., a filtering arithmetic processor such as a DSP, and thus there is no need to increase the size of the electric circuitry. Although a large-capacity coefficient memory would be required where the filter coefficients are to be time-varied, arrangements for transferring only necessary coefficient sets via the bus may eliminate a need to provide such a large-capacity memory in or in association with the filtering arithmetic processor, in this case, the large-capacity memory can be provided in or in association with a host computer. Even in a situation where the filter coefficients are not to be time-varied, and when a particular process, such as sound image localization control, is to be performed where a coordinates position of sound image localization is analyzed so that a filter coefficient set is selectively read out in accordance with an analyzed coordinates position, the provision of the coefficient memory in or in association with the host computer facilitates complex analyzing operations in the host computer. In this respect as well, the present invention can significantly simplify the construction of the filtering arithmetic processor and other components associated with the processor.

Of course, in some cases, the coefficient sets to be used in the filtering arithmetic processing by the second step may be prestored in a memory or the like of the filtering arithmetic processor, rather than being transferred via the bus. Where the filter coefficients are not to be time-varied, it is only necessary that just a single set of the filter coefficients be prestored, and thus the memory may not be required to have a particularly great capacity. Where no complex coordinates analysis is required for sound image localization, such analyzing operations may not be required. In these cases, the coefficient sets to be used in the filtering arithmetic processing can be prestored in a memory or the like of the filtering arithmetic processor.

As an example, the first step is executed by a program associated with a general-purpose processor of the computer, and the second step and third step are executed by a program associated with a filtering processor connected to the bus. Thus, the high-power host computer can be effectively prevented from being wastefully bound due to execution of the filtering processing, so that the host computer can be used with increased efficiency. In addition, the present invention allows the filtering arithmetic processor to efficiently carry out the digital filtering processing without increasing the size of the necessary electric circuitry and associated software.

According to another aspect of the present invention, there is provided a digital filter device for connection to a bus of a computer, which comprises: an interface section that collectively receives, via the bus, a predetermined number of samples of digital data at one or more desired points within a predetermined frame period; a filtering arithmetic processing section that executes predetermined filtering arithmetic processing on the digital data received by the interface section; and an output section that buffers filtered data outputted by the filtering arithmetic processing section and then outputs the filtered data buffered thereby. In a preferred implementation, the filtering arithmetic processing section executes the filtering arithmetic processing asynchronously with a predetermined sampling cycle, or at a higher rate than a predetermined sampling rate. In this case, the output section outputs the buffered filtered data in synchronism with a predetermined sampling cycle. The interface section receives a predetermined number of samples of the digital data for individual ones of a plurality of channels at different points within the frame period, and the filtering arithmetic processing section executes the filtering arithmetic processing for the individual channels within the frame period. In such a case, the output section buffers filtered data of the individual channels, from the filtering arithmetic processing section, while adding together the filtered data of the individual channels on a per-sample-point basis. Further, the interface section also receives, via the bus, a set of coefficients to be used in the filtering arithmetic processing section, and the filtering arithmetic processing section executes the filtering arithmetic processing using the set of coefficients received by the interface section.

It will be appreciated that the digital filtering method and/or device of the present invention can be applied to processing in a variety of fields, including, of course, processing of digital tone signals. Namely, the digital filtering method and/or device could be used most suitably as a method and/or device for performing efficient filtering processing in conjunction with a computer and afford superior benefits in terms of both an enhanced time-effective use of the computer and reduction in the size of the electric circuitry. The term "computer" as used in connection with the present invention should be interpreted in the broadest sense, and the term embraces not only standalone-type computer devices, equipment and facilities, such as personal computers and large-scale host computers, but also CPU-based microcomputer devices and chips incorporated in a variety of devices equipment and facilities. As an example, the basic principle of the present invention may be applied even to such a case where a microcomputer device is built in an electronic game machine, other particular computer-based device or equipment or some type of multimedia equipment and an filtering processor (such as a DSP) is connected to its bus.

For example, application of the present invention to sound image localization control can impart a high-quality sound image localization effect to a tone signal. Specifically, the present invention provides a sound image localizing device for dividing waveform data into a plurality of frames each comprising f samples and intermittently imparting a sound image localization effect to the waveform data on a frame-by-frame basis, which comprises: a first storage section that prestores therein coefficient data corresponding to positional information representative of possible positions of a sound source; a second storage section that stores therein the waveform data; an FIR-filtering arithmetic processing section that has k taps and generates filtered output data on the basis of the coefficient data and waveform data; a bus that is connected to the first storage section, second storage section and FIR-filtering arithmetic processing section and capable of burst transmission; and a control section that reads out, from the first storage section, a group of k coefficient data corresponding to the positional information of a current one of the frames and reads out, on a frame-by-frame basis, more than f+k samples of the waveform data from the second storage section in such a manner that more than the k samples of the waveform data are duplicated between the current frame and a next one of the frames adjoining the current frame, and that executes control such that the coefficient data and waveform data read out thereby are burst-transmitted via the bus to the FIR-filtering arithmetic processing section.

The control section may execute control such that the read-out coefficient data and waveform data are burst-transmitted at such short intervals that movement of the sound source can not be identified through human auditory sense. Further, the positional information may represent a position of the sound source at a substantially middle point in the frame.

Finally, the present invention can be arranged and practiced as a method invention as well as a device invention. Further, the present invention can be implemented as a computer program or microprograms for execution by a DSP or the like and also as a recording medium containing such a computer program or microprograms.

BRIEF DESCRIPTION OF THE DRAWINGS

For better understanding of the above and other features of the present invention, the preferred embodiments of the invention will be described in greater detail below with reference to the accompanying drawings, in which.

DETAILED DESCRIPTION OF THE PREFERRED EMBODIMENTS

Figure 1:
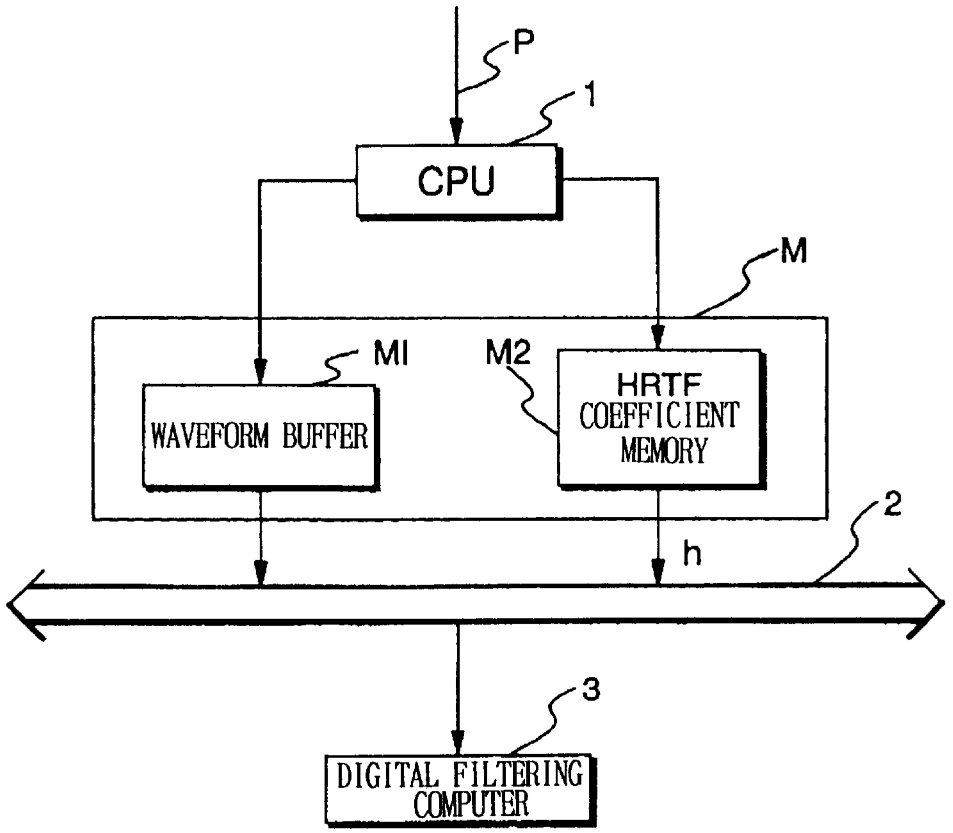
FIG. 1 is a block diagram of a three-dimensional sound positioning system which is arranged as a preferred embodiment of a sound image localizing device in accordance with the present invention.

FIG. 1 is a block diagram of a three-dimensional sound positioning system which is arranged as a preferred embodiment of a sound image localizing device in accordance with the present invention. The three-dimensional sound positioning system of FIG. 1 includes a CPU 1 that controls overall behavior of the system and a main memory M, such as an EDO (Extended Data-Out) DRAM, connected to the CPU 1. Specific storage areas of the main memory M are reserved as a waveform buffer memory M1 and a head-related transfer function (HRTF) coefficient data memory M2. In other storage areas of the main memory M, there are prestored a driver program and application programs. Upon activation of the three-dimensional sound positioning system or in response to a specific instruction input, these data and programs are read out from a secondary storage device such as a hard disk and then loaded into the main memory M.

The waveform buffer memory M1 is provided for storing waveform data W generated by a plurality of sound sources; a sampling rate or frequency of the waveform data W is, for example, 48 kHz. Further, in the HRTF coefficient data memory M2, there are prestored HRTF coefficient data in association with coordinates instructions P designating various possible coordinates of the sound sources, so that one of the prestored HRTF coefficient data corresponding to a given coordinates instruction P is read out in response to a readout instruction from the CPU 1.

This way, the waveform buffer memory M1 and HRTF coefficient data memory M2 are arranged as part of the main memory M of the three-dimensional sound positioning system. Thus, the three-dimensional sound positioning system of FIG. 1 requires no separate particular memory for storing the waveform data W and HRTF coefficient data h; that is, there is no need to provide a separate coefficient data memory in or in association with a digital filtering computer 3.

Figure 2:
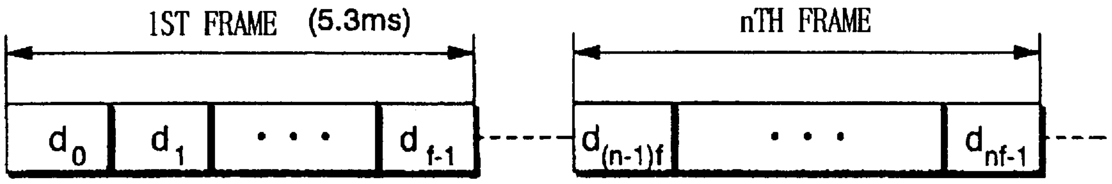
FIG. 2 is a diagram showing an exemplary format of waveform data processed in the embodiment of FIG. 1.

FIG. 2 shows an exemplary format of the waveform data W, in which a series of the waveform data W is divided into a plurality of frames each comprising f samples so that effect imparting processing is carried out on a frame-by-frame basis. If the sampling rate is set to 48 kHZ and each of the frames is set to have 256 samples, then each frame period will be about 5.3 ms. as shown.

Reference numeral 2 in FIG. 1 represents a bus unit capable of high-speed data transfer, which preferably comprises a PCI (Peripheral Component Interconnect) bus unit. The PCI bus unit includes data and address buses each having a 32-bit (or 64-bit) width. Further, the operating clock frequency of the PCI bus unit is 33 MHz, which would theoretically provide for a maximum data transfer rate of 132 Mbyte/sec. (or 264 Mbyte/sec.) Furthermore, a bus-master function supported by the PCI bus unit can substantially reduce the loads on the CPU and on a high-speed DMA that is not controlled by a general-purpose controller.

In addition, the PCI bus unit has a burst transmission mode which is not supported by the conventional ISA bus unit and in which a plurality of data are transmitted together in succession in response to only one address designation. Use of such a burst transmission mode provides for high-speed readout of successive data from a DRAM (Dynamic RAM) that also has a burst transmission mode. The PCI bus unit has an additional advantage that an interface for connection with the bus unit can be manufactured at reduced cost. The foregoing are the primary reasons why the PCI bus unit is used in the described embodiment; however, any other forms of extended bus unit than the PCI bus unit may be employed in the embodiment as long as they have characteristics similar to those of the PCI bus unit.

Figure 3A:
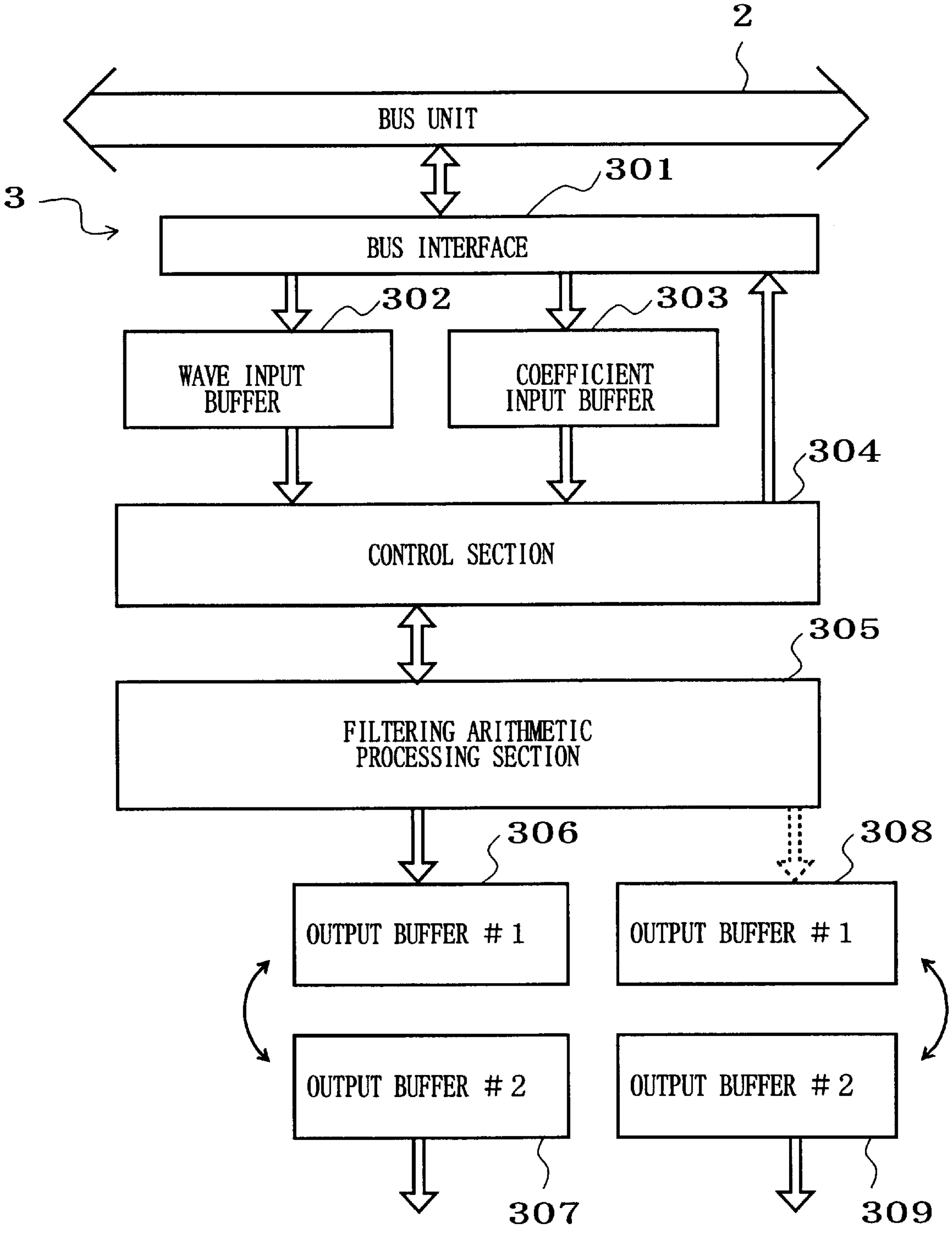
FIGS. 3A and 3B are functional block diagrams of a digital filtering computer shown in FIG. 1.

Reference numeral 3 in FIG. 1 represents a digital filtering computer connected with the bus unit 2, which performs arithmetic operations, including multiplications and additions, at high speed; in particular, the digital filtering computer 3 in the described embodiment carries out simple FIR (Finite Impulse Response)-filtering arithmetic operations. The digital filtering computer 3 is implemented by a DSP (Digital Signal Processor). FIG. 3A is a functional block diagram of the digital filtering computer 3.

Figure 3B:
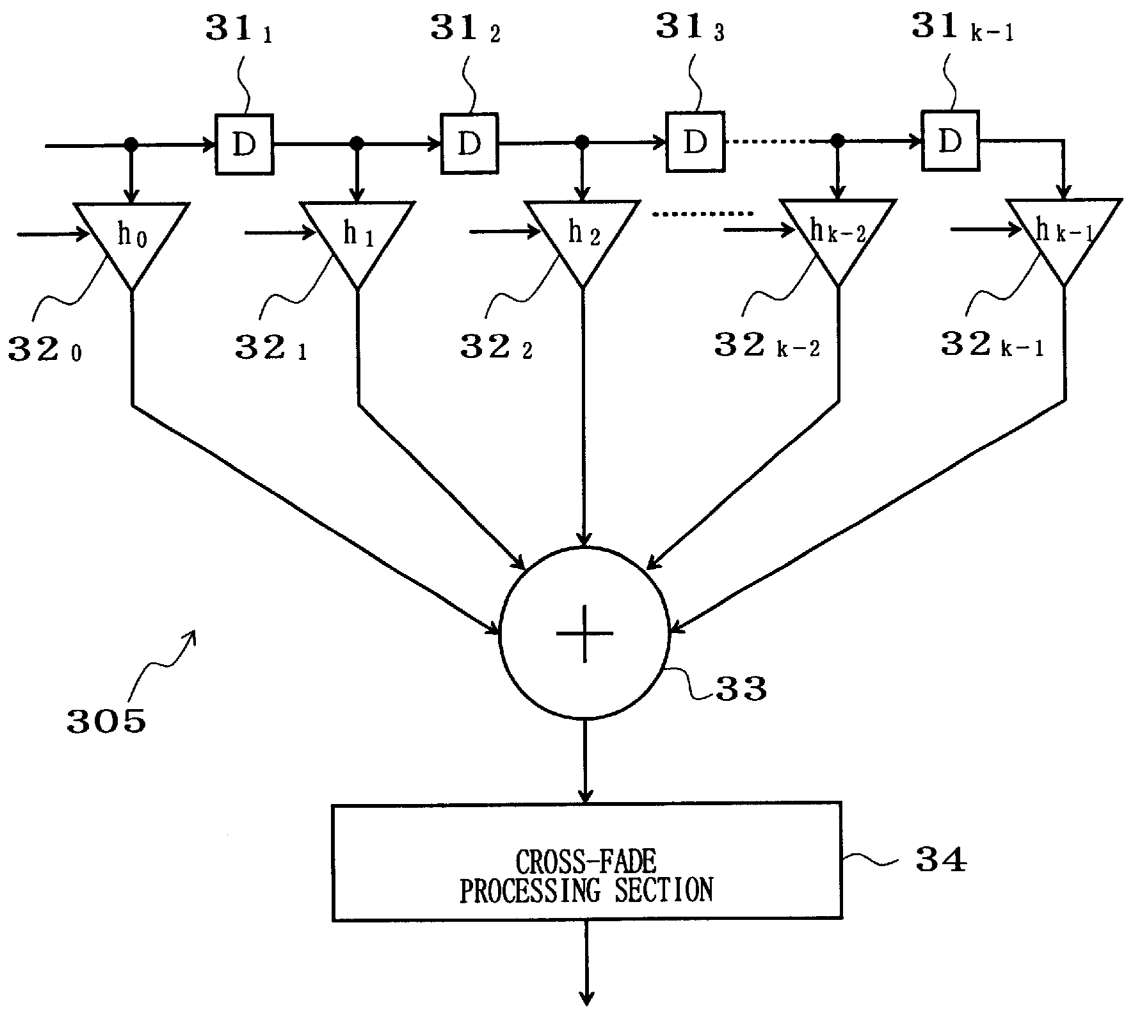

In the digital filtering computer 3, data are communicated with the bus unit 2 by way of a bus interface 301. Of the data burst-transmitted via the bus unit 2, a wave input buffer 302 buffers one transfer unit of waveform sample data (e.g., "f+k+j" samples), and a coefficient input buffer 303 buffers one transfer unit of filter coefficient data (e.g.,. k coefficient data). Control section 304, which performs various control including control of data exchange between various elements in the digital filtering computer 3, supplies a filtering arithmetic processing section 305 with the waveform sample data and filter coefficient data buffered in the wave input buffer 302 and coefficient input buffer 303, respectively, and allows the processing section 305 to execute, at high speed, filtering arithmetic operations based on the supplied data in accordance with a predetermined algorithm. FIG. 3B is a functional block diagram showing a typical example of a filtering arithmetic operation algorithm carried out by the processing section 305; specifically, the processing section 305 executes simple FIR (Finite Impulse Response)-filtering arithmetic operations in accordance with the algorithm.

In FIG. 3B, reference numerals $\mathbf{31}_1$ to $\mathbf{31}_{k-1}$ represent D flip flops which operate in synchronism with sampling clock pulses. Reference numerals $\mathbf{32}_0$ to $\mathbf{32}_{k-1}$ represent multipliers into which are set HRTF coefficient data $h_0$ to $h_{k-1}$ for multiplication with the waveform data W. Adder 33 adds together respective output data from the individual multipliers $\mathbf{32}_0$ to $\mathbf{32}_{k-1}$. The above-mentioned elements together constitute a single FIR filter having k taps (i.e., "k−1"-order FIR filter). Sound effect process is performed on the waveform data W by providing a pair of such FIR filters on the basis of HRTF coefficient data corresponding to left and right processing channels in the embodiment. Thus, it is possible to give the waveform data W an effect that makes listeners feel as if the sound source moved, to thereby produce stereophonic presence.

Further, reference numeral 34 in FIG. 3B represents a cross-fade processing section which performs cross-fade processing on output data from the adder 33 as will be later described in detail.

Filtered (and cross-faded) data output from the cross-fade processing section 34 are additively stored into one of output buffers 306 and 307 functioning as a double buffer as shown in FIG. 3A. Each of the output buffers 306 and 307 has a specific number of address locations corresponding to the number of samples (i.e., f samples) in one frame of the waveform data and stores each sample of the filtered output data into one of the address locations. In the illustrated example, the filtering arithmetic processing section 305 in the digital filtering computer 3 is designed to execute filtering arithmetic operations on one frame of the waveform data for each of a plurality of channels, independently of the other channels, at high speed, and additively store each sample of the filtered output data into a corresponding address location in one of the output buffers 306 and 307. Thus, when the high-speed filtering arithmetic operations for one frame are completed for all of the channels, each of the address locations in one of the output buffers 306 and 307 placed in the write mode has stored therein results of the filtering arithmetic operations performed on one of the f samples for the individual channels.

The output buffers 306 and 307, functioning as the double buffer, are controlled to be alternately switched, once for every frame, between the write mode and the read mode. Namely, one of the output buffers 306 and 307 placed in the write mode in a last frame period is switched, at the beginning of a current frame period, to the read mode so that the additively stored results of the filtering arithmetic operations performed on the f samples for the individual channels are read out therefrom with a predetermined sampling rate or frequency (e.g., 48 kHz). Note that to produce filtered outputs for the left and right processing systems, output buffers 308 and 309 are provided, in addition to the output buffers 306 and 307, to function as another double buffer. In the preferred embodiment, the filtering arithmetic processing section 305 may either be shared between the left and right filtering processing, or be provided separately for each the left and right filtering processing.

Here, the terms "plurality of channels" as used herein refer to channels each using a separate set of filtering coefficients, i.e., to filter processing channels. When, for example, waveform data from three sound sources (three-channel waveform data) are to be subjected to the filtering arithmetic processing based on head-related transfer functions (HRTFs) corresponding thereto, the filtering arithmetic processing is carried out in three channels for the left processing system and in other three channels for the right processing system, using the respective HRTF coefficient data.

Because it is only necessary for each of the above-mentioned buffers 302 and 303 and 306 to 309 to have addresses enough for buffering one frame of data only for one of the channels, their capacity can be very small as a whole. More specifically, even when the filtering arithmetic processing is to be performed for a plurality of channels, the digital filtering computer 3, in one frame period, performs the filtering arithmetic operations for one of the plurality of channels, independently of the other channels, at high speed (i.e., at higher rate than an output sampling frequency), so that it is only necessary for each of the input buffers 302 and 303 to have a capacity to buffer data for the one channel that would be necessary for the filtering arithmetic operations for only one frame to be processed in the frame period. Similarly, it is only necessary for each of the output buffers 306 to 309 to have a capacity to buffer f samples of the output data for one frame.

Figure 4A:
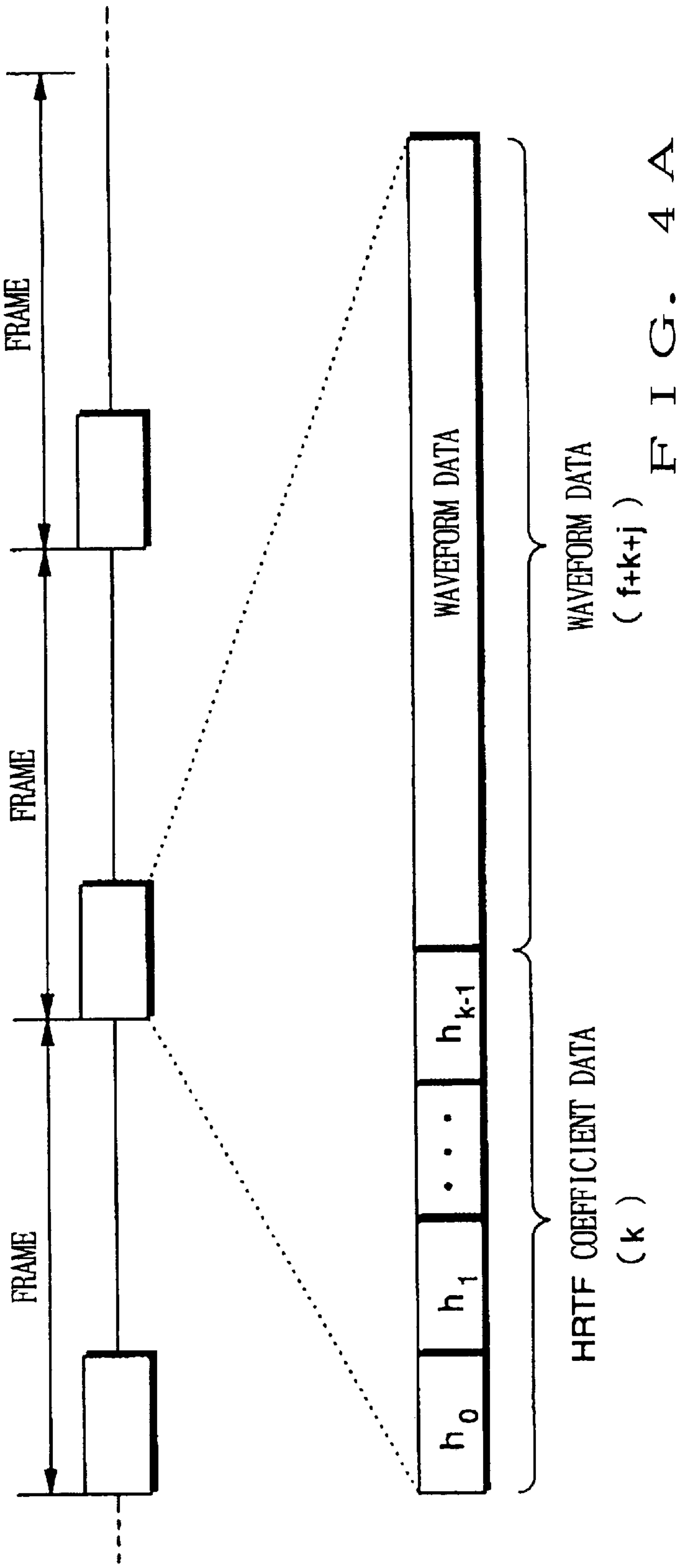
FIGS. 4A and 4B are diagram explanatory of an exemplary manner in which burst transmission is executed for processing of a single sound.

Here, the data read out from the main memory M are transferred to the digital filtering computer 3 intermittently via the bus unit 2. FIG. 4A is a diagram showing an exemplary manner in which is carried out burst transmission corresponding to processing of a single sound. As shown, during one burst transmission, a specific number of the HRTF coefficient data h corresponding to the number k of the taps in the digital filtering computer 3 and a predetermined number of samples ("f+k+j" samples) of the waveform data W, greater than the number k of the taps, are transferred to the digital filtering computer 3 via the bus 2.

In the described embodiment, the bus 2 is effectively prevented from being always occupied by the sound effect imparting processing. The example of FIG. 4A has been described above as transferring, to the digital filtering computer 3, the waveform data W corresponding to a single sound source and the HRTF coefficient data $h_0$ to $h_{k-1}$ for one processing system; in practice, however, the waveform data W and the HRTF coefficient data for the two processing systems corresponding to the left and right ears are transferred to the digital filtering computer 3. Further, when the sound effect imparting processing is to be performed simultaneously on a plurality of sounds, the data can be transferred on the time-divisional basis, because the bus unit 2, preferably comprising the PCI bus unit, is capable of high-speed data transfer; thus, sound image localizing processing can be performed on a plurality of sounds from a plurality of sound sources.

The HRTF coefficient data $h_0$ to $h_{k-1}$ vary successively as the sound source moves, because these data are determined by the head-related transfer function (HRTF). Accordingly, it is desirable that the HRTF coefficient data $h_0$ to $h_{k-1}$ be updated every sample cycle. However, for updating the HRTF coefficient data $h_0$ to $h_{k-1}$ every sample cycle, these data $h_0$ to $h_{k-1}$ have to be read out from the HRTF coefficient data memory M2 within a very short time, and there is a further need to transfer the thus read-out data via the bus unit 2. In such a case, the bus unit 2 will be occupied for a relatively long time, which will unavoidably lead to a struggle for the bus unit 2 between the operations to transfer the HRTF coefficient data $h_0$ to $h_{k-1}$ and other operations. However, even when the sound source has moved discontinuously at short time intervals, human listeners can not perceive the discontinuity through their auditory sense and would feel as if the sound source had moved continuously. In other words, only when the sound source has moved discontinuously with an interval not longer than a certain limit, the human listeners auditory sense would identify the discontinuity.

For the above-mentioned reason, the filtering arithmetic processing in the described embodiment is divided into predetermined frame periods and treats the head-related transfer function (HRTF) as not varying (remaining constant) within one such frame period, so as to reduce the number of coefficients to be transferred and also reduce the time when the bus unit 2 is occupied by the data transfer. Namely, the preferred embodiment of the present invention is designed to update the head-related transfer function (HRTF) at short time intervals, preferably below about 10 ms., such that variations in the head-related transfer function (HRTF) can not be perceived by the human listeners' auditory sense.

In the illustrated example, each period in which the HRTF coefficient data $h_0$ to $h_{k-1}$ are updated in the digital filtering computer 3 is set to coincide with the burst-transmission period (i.e., the frame period); specifically, the updating period is set to less than 10 ms. If the sampling frequency is set to 48 kHZ and each of the frames is set to have 256 samples, then the updating period will be about 5.3 ms. When the sound source is moving rapidly, there occur great variations in the head-related transfer function (HRTF), so that the human listeners feel through their auditory sense as if the movement of the sound source were discontinuous. Thus, the described embodiment is arranged to carry out cross-fade processing, as will be later described in detail, so that such a sound source movement may sound continuous to the human listeners.

Now, behavior of the embodiment will be described in detail with reference to the attached drawings.

Figure 4B:
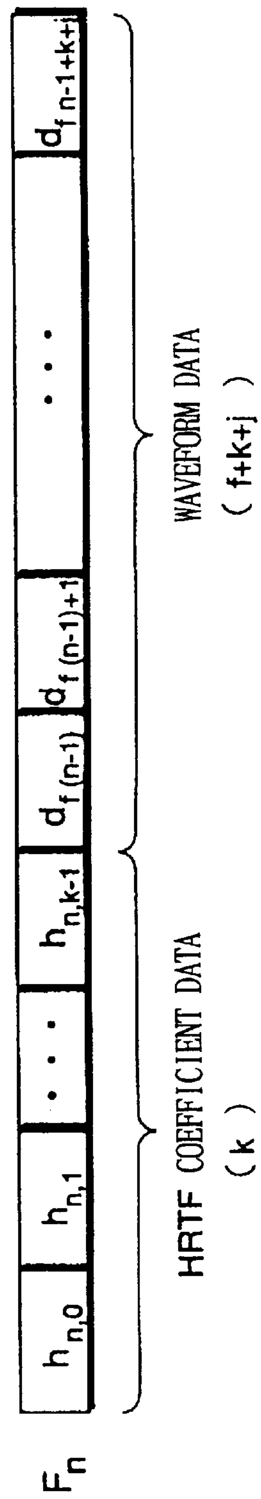

As seen in FIG. 4B, a group of data Fn to be transferred from the driver via the bus unit 2 in an "n"th frame may be expressed by $$Fn=(h_{n,0}, h_{n,1}, \ldots, h_{n,k-1}, d_{f(n-1)}, d_{f(n-1)+1}, \ldots, d_{fn-1+k+j})$$

where f represents a total number of samples in one frame and j represents a total number of duplicated or redundant samples. As shown, the data group Fn to be transferred comprises k HRTF coefficient data $h_{n,0}$ to $h_{n,k-1}$ and "f+k+j" samples of waveform data $d_{f(n-1)}$ to $d_{fn-1+k+j}$. The reason why the number of samples of the waveform data to be transferred is "f+k+j" which is greater than the total number of samples (f samples) in one frame is as follows. The FIR filtering arithmetic processing first performs multiplying and adding operations between the waveform data W and the HRTF coefficient data h corresponding to the number k of the taps in the filter, so as to produce output data corresponding to a given sample. Thus, "f+k" waveform data W are required to produce output data for one entire frame period (f samples) and j samples of waveform data are required for an overlapping process in the later-described cross-fade processing, so that the number of the waveform data to be transferred will amount to "f+k+j". Namely, in this example, by retransferring a greater number of the waveform data W than the f samples in one frame period, the digital filtering computer 3 is allowed to execute necessary operations in an intermittent manner.

The following paragraphs describe an example of the FIR filter processing carried out by the filtering arithmetic processing section 305 in the embodiment. In a given frame, the filtering arithmetic processing section 305 processes f samples of one frame of the waveform data, and j samples of the waveform data for the later-described overlapping process.

Here, vector Xn constituted by output data from the adder 33 in the "n"th frame may be expressed by the following equation:

$$Xn=(Hn\cdot D_{[f(n-1):f(n-1)+k-1)]}, Hn\cdot D_{[f(n-1)+1:f(n-1)+k]}, \ldots =Hn\cdot D_{[fn+j:fn-1+k+j]})=(x_{n,0}, x_{n,1}, \ldots, x_{n,f+j-1})$$

where the mark "·" represents an inner product of the vector.

Relationship between order and data of the samples is defined as follows. If the HRTF coefficient data $h_0$ to $h_{k-1}$ corresponding to the number k of the taps in the "n"th frame are represented by $h_{n,0}$, $h_{n,1}$, $h_{n,2}$, . . . $h_{k-1}$, then a coefficient vector constituted by these coefficient data Hn may be expressed by the following equation:

$$Hn=(h_{n,0}, h_{n,1}, h_{n,2}, \ldots, h_{n,k-1})$$

Further, a vector D of successive samples of the waveform data may be expressed by the following equation:

$$D=(d_0, d_1, d_2, \ldots d_m)$$

where $d_0$, $d_1$, $d_2$, . . . $d_m$ represent the successive waveform data samples.

Furthermore, a vector $D_{[a]}$ constituted by "a"th waveform data $d_a$ and a vector $D_{[a:\,b]}$ constituted by "a"th to "b"th waveform data $d_a$ to $d_b$ may be expressed by the following equations:

$$D_{[a]}=d_a$$

$$D_{[a:\,b]}=(d_a, d_{a+1}, \ldots d_b)$$

Vector $X_n$ will be considered in more detail using the above-noted definitions. First, as the data shown in FIG. 4B are sequentially supplied to the digital filtering computer 3, the coefficient data $h_{n,0}$, $h_{n,1}$, . . . , $h_{n,k-1}$, are sequentially set into the multipliers $\mathbf{32}_0$ to $\mathbf{32}_{k-1}$, respectively. After that, an internal product between the k waveform data $d_{f(n-1)}$ to $d_{f(n-1)+k-1}$ and the coefficient data $h_{n,0}$, $h_{n,1}$, . . . , $h_{n,k-1}$ is calculated to thereby produce output data $x_{n,0}$. Therefore, the output data $x_{n,0}$ may be given using the following equation:

$$x_{n,0}=h_{n,0}d_{f(n-1)+1}+h_{n,1}d_{f(n-1)+2}+, \ldots, +h_{n,k-1}d_{f(n-1)+k-1}$$

Then, the arithmetic operations are carried out after shifting the waveform data by one sample, to produce output data $x_{n,1}$ as represented by the following equation:

$$xn,0=h_{n,0}d_{f(n-1)+1}+h_{n,1}d_{f(n-1)+2}+, \ldots, +h_{n,k-1}d_{f(n-1)+k}$$

Thereafter, by repeating similar arithmetic operations while sequentially shifting the waveform data, output data $x_{n,0}$ to $x_{n,f+j-1}$ will be produced from the adder 33.

Figure 5:
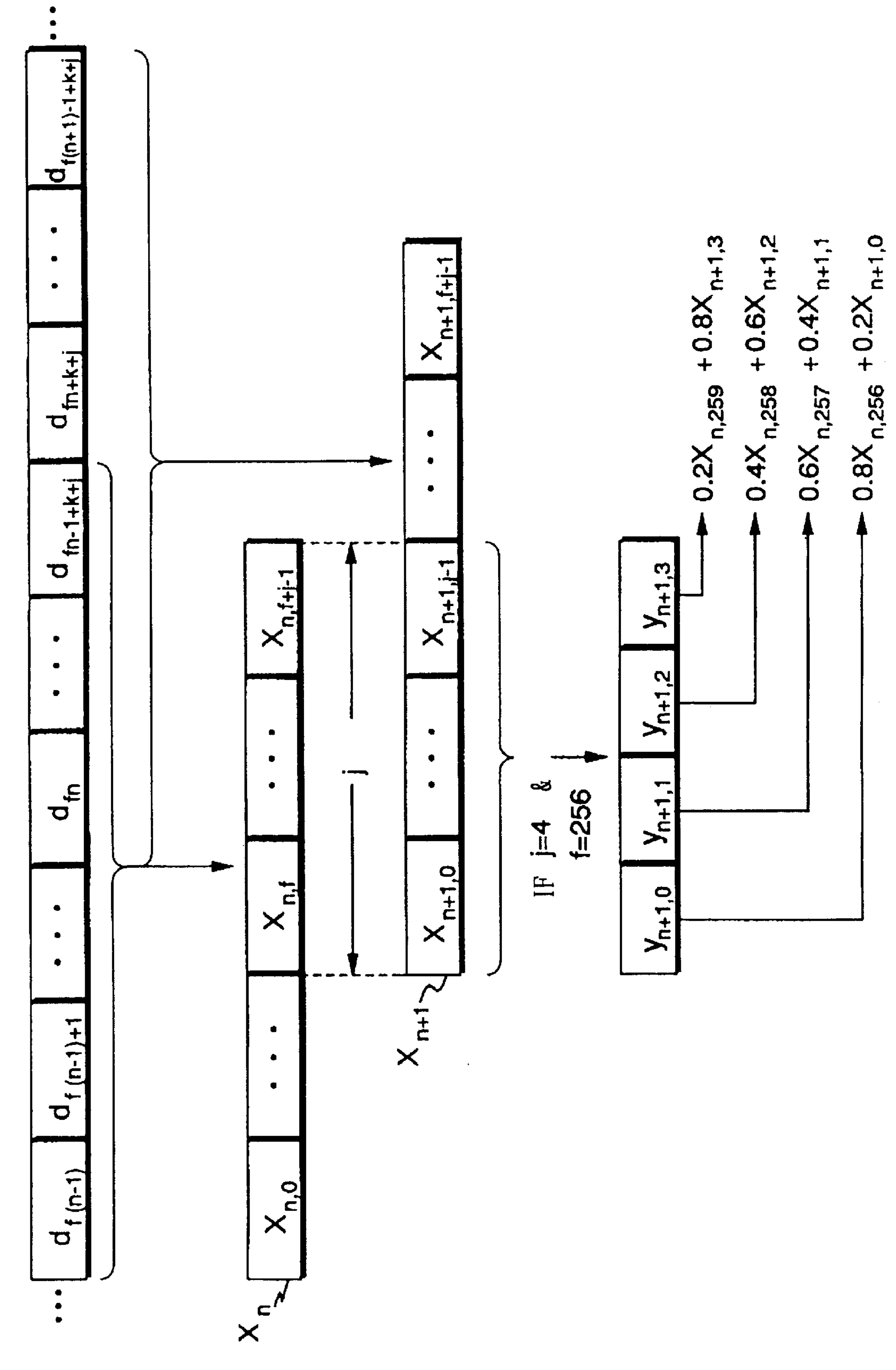
FIG. 5 is a conceptual diagram explanatory of an example of cross-fade processing executed in the embodiment.
Figure 6:
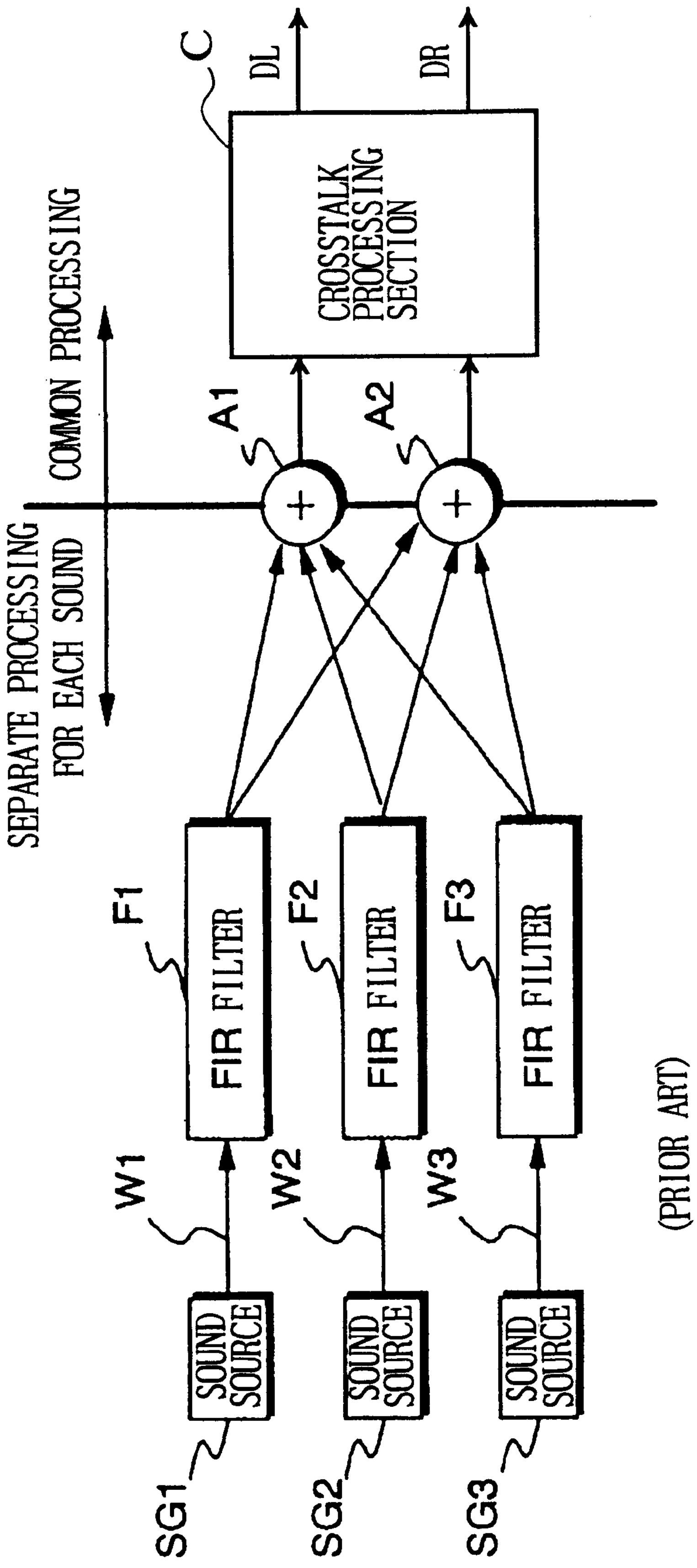
(PRIOR ART) FIG. 6
FIG. 6 is a functional block diagram showing behavior of a conventional three-dimensional sound positioning system.
Figure 7:
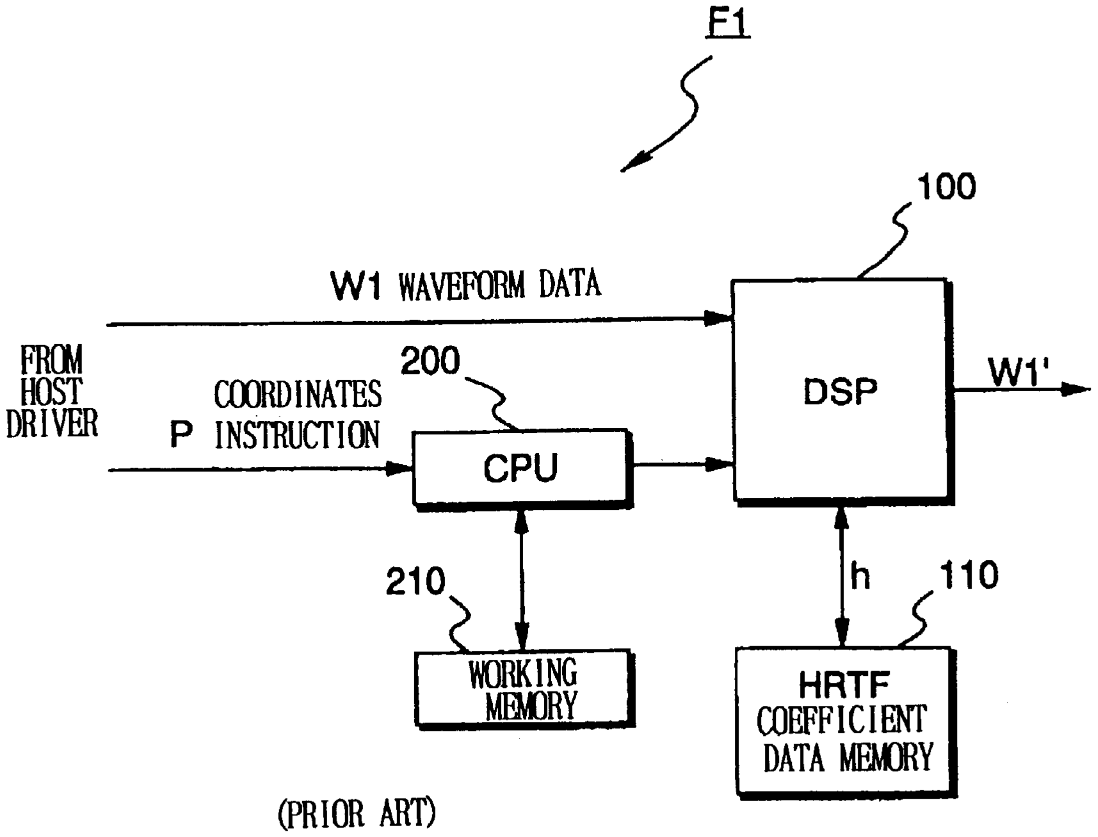
FIG. 7 is a block diagram of an FIR filter shown in FIG. 6

Now, a description will be made about the cross-fade processing carried out by the cross-fade processing section 34 of the filtering computer 305. FIG. 5 is a conceptual diagram explanatory of the cross-fade processing. The above-mentioned output data $x_{n,0}$ to $x_{n,f+j-l}$ of the "n"th frame and output data $x_{n+1,0}$ to $x_{n+1,f+j-1}$ of the "n+1"th frame are generated on the basis of the waveform data $d_{f(n-1)}$ to $d_{f(n+1)-1+k+j}$, as shown in FIG. 5. As seen from the figure, the waveform data $d_{fn}$ to $d_{fn-1+k+j}$ are used, in a redundant or duplicated manner, in both of the "n"th and "n+1"th frames. As a consequence, output data $x_{n,f}$ to $x_{n,f+j-1}$ and output data $x_{n+1,0}$ to $x_{n+1,j-1}$, both amounting to the number "j", are generated redundantly in a duplicated condition on the basis of different HRTF coefficient data.

Then, cross-fade processing is executed between the "n"th and "n+1"th frames on the basis of these output data $x_{n,f}$ to $x_{n,f+j-1}$ and $x_{n+1,0}$ to $x_{n+1,j-1}$. Here, if a vector constituted by the output data from the cross-fade processing section 34 in the "n+1" frame is represented by Yn.

$$Yn+1=((1-a\beta)Xn_{[f+a-1}]+a\beta Xn+1_{[a-1]}, Xn+1_{[j:k]}$$

where β=1/j, and "a" represents order of duplicated or redundant data which is a natural number not greater than the number "j".

If j=4 and f=256, output data $Y_{n+1,0}$ to $Y_{n+1,j-1}$ corresponding to the duplicated part in the "n+1"th frame may be represented by the following equations, as shown in FIG. 5:

first (a=1); $Y_{n+1,0}=0.8x_{n,256}+0.2x_{n+1,0}$ second (a=2); $Y_{n+1,1}=0.6x_{n,257}+0.4x_{n+1,1}$ third (a=3); $Y_{n+1,2}=0.4x_{n,258}+0.6x_{n+1,2}$ fourth (a=4); $Y_{n+1,4}=0.2x_{n,259}+0.8x_{n+1,3}$ Namely, as generation of data in the duplicated part progresses, influence of the output data of the "n"th frame becomes smaller while influence of the output data of the "n+1"th frame becomes greater. Thus, even when the sound source has moved rapidly, the sound source movement would sound natural and continuous to the listeners.

Let's assume here that, of the data generated in the redundant manner for the purpose of cross-fade processing, the duplicated data in the preceding frame (e.g., "j" filtered output data $x_{n,f}$ to $x_{n,f+j-1}$ of the "n"th frame) are buffered for use in the cross-fading arithmetic operations to be carried out in the next frame period. For that purpose, a specific number ("the number of channels"×"j" will be sufficient) of buffer storage areas may be provided within the cross-fade processing section 34; alternatively, the output data $x_{n,f}$ to $x_{n,f+j-1}$ may be transferred via the bus unit 2 to the main memory M for temporary storage therein so that they are burst-transmitted, along with other data, to the digital filtering computer 3 in the next frame period. Namely, the filtered output data $x_{n,f}$ to $x_{n,f+j-1}$ calculated in the "n"th frame for the cross-fade processing (i.e., for the overlapping or duplication purpose) are appropriately buffered before the beginning of the next "n+1"th frame and then subjected to cross-fade synthesis with "j" filtered output data $x_{n+1,0}$ to $x_{n+1,j-1}$ in the former part of the "n+1"th frame. Results of the cross-fade synthesis are provided as "j" filtered (and cross-faded) output data in the former part of the "n+1"th frame. These "j" filtered (and cross-faded) output data, along with the following "f−j" filtered output data $x_{n+1,j}$ to $x_{n+1,f-1}$, are transferred to the output buffer 306 or 307 as a total of "f" filtered (and cross-faded) output data of the "n+1" frame and then stored into "f" address locations of the output buffer 306 or 307.

With the arrangement that a specific number of the waveform data W greater than the number k of the taps are retransferred in a next frame so as to execute the filter processing for each of the frames of the waveform data, the above-described embodiment allows the filter processing to be performed on the successive waveform data even though the data are burst-transmitted via the bus unit 2 to the digital filtering computer 3.

Further, with the arrangement that the waveform data W and HRTF coefficient data are held in the driver and, when necessary, transferred via the bus unit 2 in divided form for each of the frames, there is no need for the digital filtering computer 3 to include a memory for storing all of the waveform data W and all of the time-varying HRTF coefficient data h. In addition, because the digital filtering computer 3 only has to execute normal filtering arithmetic processing where multiplying and adding arithmetic operations are carried out at predetermined timing, there is no need to provide a particular controller that interprets and executes a coordinates instruction for controlling sound image localization. Thus, when, for example, the digital filtering computer 3 is to be mounted on an extension board as a sound generator device, the sound generator device and hence the extension board can be greatly simplified in construction and its cost can be reduced substantially.

Furthermore, the preferred embodiment has been described as burst-transmitting the waveform data W and HRTF coefficient data h in each of the frame periods and executing the filtering arithmetic processing using same HRTF coefficient data h for a single frame. In this case, because the HRTF coefficient data h is updated in each cycle of the burst transmission, movement of the sound source would sound discontinuous from a theoretical point of view. However, even when the sound source has moved discontinuously at a certain speed, human auditory sense would identify the sound source movement as continuous. Thus, by setting burst transmission period (frame period) to a sufficiently short period such that normal-speed movement of the sound source may be detected by human listeners as continuous, there is achieved sound image localization free of unsmoothness and unnaturalness.

Moreover, in the above-described embodiment, redundant or duplicated waveform data (amounting the number "j") are burst-transmitted along with one frame of "f" waveform data as well as "k" waveform data for the filtering arithmetic processing, so that the filtering arithmetic processing is executed on the "j" waveform data in adjoining frames using different HRTF coefficient data. because the cross-fade processing is performed on the filtered data, the sound source movement would sound even more continuous to the human listeners. As a consequence, even when the sound source has moved rapidly, the embodiment allows the human listeners to feel as if the sound source had moved continuously.

It should be appreciated that the present invention is not limited to the above-described embodiment alone and various modifications of the present invention are also possible as stated below.

In the above-described embodiment, the HRTF coefficient data h are burst-transmitted for each of the frames, and updating of the coefficient data h is effected in the digital filtering computer 3 in synchronism with the frame cycle. In this case, the HRTF coefficient data h in a given frame can be treated as a representative value of the frame as long as it is generated at a point within the frame period.

Precisely speaking, the HRTF coefficient data h are changing every sample timing since they are generated on the basis of coordinates P of the sound source. By generating the HRTF coefficient data h, representing a given frame, at a substantially middle point of the frame, it is possible to minimize an error of the coefficient data so that a rapid sound source movement would be detected by human auditory sense as even more continuous. Therefore, it is desirable that the HRTF coefficient data h be generated on the basis of coordinates P of the sound source at a substantially middle point of the frame.

The preferred embodiment has been described as retransferring a specific number of the waveform data samples corresponding to the number k of the taps in the FIR filter (i.e., the number of coefficients in a coefficient set), the present invention is not so limited. Namely, the present invention proposes a novel intermittent filtering scheme for use with general digital filters, and thus the principle of the present invention is applicable to any digital filters irrespective of their purposes of use and types of digital data processed thereby. In this case, the filter coefficient may be fixed rather than being varied over time, in which case the filter coefficient may be retained in the digital filtering computer 3 in stead of being burst-transmitted via the bus unit 2. The present invention may be applied to an IIR (Infinite Impulse Response) filter as well as to the FIR filter.

In short, it is essential that, when the filtering arithmetic processing is to be executed intermittently on input data divided into into frames each amounting to "f" samples and transferred to the filter provided with "k" taps (i.e., using "k" coefficients), only "f+n" samples of the input data are actually transferred to the filter in a given frame period, and then "n+f" samples of the input data are resent to the filter in the next frame so that "n" samples in the latter part of the frame are duplicated and thereby a condition of "n≧k" is established. In this case, the processing can be executed in succession because the "n" input data more than the number of the taps k are resent to the filter.

Besides, whereas the cross-fade processing has been described as being executed in the cross-fade processing section 34, this cross-fade processing, i.e., an interpolating processing, may be omitted whenever appropriate. In another alternative, a cross-fade synthesis processing (or interpolating) section may be provided somewhere external to the filtering device, i.e., on or near the output side of the output buffer, without the cross-fade processing section 34 being provided within the filtering arithmetic processing section 305. In such a case, cross-fading (interpolating) arithmetic operations will be carried out at timing synchronous with a predetermined sampling cycle.

Although the frame period, which is a filtering processing unit time, is treated as fixed in the described embodiment, the frame period may be varied as necessary. Namely, the number of samples constituting one frame may be varied; For example, where four sounds are to be processed simultaneously, the frame may be set to consist of 256 samples, or where two sounds are to be processed simultaneously, the frame may be set to consist of 128 samples. In such a case, time intervals at which the HRTF coefficient data are updated can be shortened to enhance directional accuracy of sound image localization, because a smaller number of simultaneously-processed sounds would result in a shorter burst transmission period.

Moreover, whereas the preferred embodiment has been described as transferring one frame of data through one burst transmission, one frame of data may be transferred dividedly through two or more collective transmissions.

Furthermore, each of the output buffers 306 to 309 in the described embodiment has been described as buffering filtered data of a plurality of channels additively stored on the sample-by-sample basis. However, the present invention is not so limited, and these output buffers may be provided separately for each of the channels, so as to simply buffer filtered data of that channel alone without involving the data adding operations. In addition, data readout, by the digital filtering computer 3, from the output buffers 306 to 309 need not always be effected in predetermined sampling cycles; as an example, the digital filtering computer 3 may read out the filtered data from the output buffers 306 to 309 at high speed and transfer the read-out data to a separate output device or another device utilizing the data so that the output device or data-utilizing device ultimately outputs the data in synchronism with the predetermined sampling cycles.

Furthermore, whereas the number k of the taps (i.e., the number of coefficients in a coefficient set) in the digital filtering computer 3 has been described as being fixed, it may be varied depending on the number of sounds to be simultaneously processed. For example, if the number of sounds is four, the number k of the taps may be set to "90", or if the number of sounds is 14, the number k of the taps may be set to "25". Because the number of the taps increases as the number of sounds decreases, this alternative arrangement achieves a filter capable of more faithfully reproducing the head-related transfer function (HRTF) in cases where a relatively small number of sounds are to be generated at a time. In cases where a relatively great number of sounds are to be generated at a time, on the other hand, the alternative arrangement can avoid a struggle for the bus unit 2 by reducing the time when the bus unit 2 is occupied per sound, because the number of data to be transferred cane be reduced as the number of sounds increases.

In summary, with the above-stated characteristic arrangement that input data duplicated between adjoining frames are transferred to the digital filter, the present invention allows the digital filter to operate in an intermittent manner. Through the intermittent digital filtering arithmetic processing, the present invention achieves a sound image localizing device which can impart a high-quality sound image localization effect without increasing the size of necessary electric circuitry.

What is claimed is:

1. A digital filtering method for executing digital filtering processing for a plurality of channels, said method comprising the steps of:

a first step of collectively transferring, via a bus of a computer, a plurality of samples of digital data to be filtered for one of the plurality of channels;

a second step of executing filtering processing, based on a predetermined filter function, on the plurality of samples of digital data for the one channel transferred by said first step, at a processing rate higher than a predetermined sampling rate;

a third step of buffering the digital data having been subjected to the filtering processing by said second step; and a fourth step of repeating said first to third steps for each of the remaining ones of the plurality of channels.

2. A digital filtering method as recited in claim 1 wherein said first step divides a series of the digital data to be filtered into a plurality of data sections and intermittently transfers digital data blocks each comprising a plurality of samples of the digital data belonging to one of the data sections, and when transferring the digital data belonging to any one of the data sections, said first step transfers, along with the digital data belonging to the one data section, part of the digital data belonging to another of the data sections adjoining the one data section, to thereby transfer a time series of the digital data consisting of a greater number of samples than a total number of samples contained in the one data section, and wherein said second step executes the filtering processing based on the predetermined filter function using said time series of the digital data consisting of a greater number of samples than a total number of samples contained in the one data section, to thereby provide filtered data corresponding to at least the total number of samples contained in the one data section.

3. A digital filtering method as recited in claim 2 wherein the part of the digital data, belonging to the other data section, to be transferred by said first step, consists of a specific number of samples corresponding at least to a given number of coefficients used in the predetermined filter function.

4. A digital filtering method as recited in claim 3, wherein a predetermined number of interpolating samples of digital data are further included as said part of the digital data belonging to the other data section, and said second step provides the filtered data consisting of a sum of the total number of samples contained in the one data section and the predetermined number of interpolating samples, wherein said digital filtering method further comprises a fifth step of buffering, for a next one of the data sections, a part of the filtered data that corresponds to the predetermined number of interpolating samples, and a sixth step of executing a predetermined interpolating process using the part of the filtered data that is buffered by said fifth step in a preceding one of the data sections and another part of the filtered data that corresponds to the total number of samples contained in a current one of the data sections, and wherein said third step buffers the digital data that have been subjected to the interpolating process and corresponds to the total number of samples on the one data section and outputs, at the predetermined sampling rate, the digital data buffered thereby.

5. A digital filtering method as recited in claim 4 wherein said first step also transfers, via the bus, a set of coefficients to be used in the filtering processing for the one data section, and said second step executes the filtering processing using the set of coefficients transferred by said first step, and wherein using a different set of the coefficients for each of the data sections, said second step is capable of executing the filtering processing with a time-varying characteristic.

6. A digital filtering method as recited in claim 2 wherein with respect to a first one of the data sections, said first step transfers a time series of f+n samples of the digital data that corresponds to a sum between f samples contained in the first data section and predetermined n samples in a former part of a second one of the data sections following said first data section, and with respect to the second data section, said first step retransfers the n samples of the digital data in the former part of said second data section already transferred with respect to said first data section and also transfers f samples of the digital data in a following part of said second data section, and wherein said n samples are equivalent or greater in number than a total number k of coefficients in said set of coefficients to be used in the filtering processing, i.e., $n \geqq k$.

7. A digital filtering method as recited in claim 1 wherein said first step also transfers, via the bus, a set of coefficients to be used in the filtering processing, and said second step executes the filtering processing using the set of coefficients transferred by said first step.

8. A digital filtering method as recited in claim 1 wherein said second step includes a step of buffering the plurality of samples of digital data transferred by said first step and executes the filtering processing based on the predetermined filter function on the plurality of samples of digital data buffered by said step of buffering.

9. A digital filter device for executing digital filtering processing for a plurality of channels, said digital filter device comprising:

a first section that collectively transfers, via a bus of a computer, a plurality of samples of digital data to be filtered for each one of the plurality of channels;

a second section that executes filtering processing, based on a predetermined filter function, on the plurality of samples of digital data for each one of the plurality of channels transferred by said first section, at a rate higher than a predetermined sampling rate; and a third section that buffers the digital data having been subjected to the filtering processing by said second section.

10. A machine-readable recording medium containing a group of instructions of a program for causing a processor to execute a method of filtering processing for a plurality of channels, said method comprising the steps of:

a first step of collectively transferring, via a bus of a computer, a plurality of samples of digital data to be filtered for one of the plurality of channels;

a second step of executing filtering processing, based on a predetermined filter function, on the plurality of samples of digital data for the one channel transferred by said first step, at a rate higher than a predetermined sampling rate;

a third step of buffering the digital data having been subjected to the filtering processing; and a fourth step of repeating said first to third steps for each of the remaining ones of the plurality of channels.

11. A machine-readable recording medium as recited in claim 10 where said first step is executed by a program associated with a general-purpose processor of the computer, and said second step and third step are executed by a program associated with a filtering arithmetic processor connected to the bus.

12. A digital filter device for executing filtering arithmetic processing for a plurality of channels, said digital filter device comprising:

an interface section that collectively receives, via a computer bus, a predetermined number of samples of digital data for each one of the plurality of channels at one or more giver time points within a predetermined frame period;

a filtering arithmetic processing section that executes predetermined filtering arithmetic processing on the digital data received by said interface section; and an output section that buffers filtered data outputted by said filtering arithmetic processing section and then outputs the filtered data buffered thereby.

13. A digital filter device as recited in claim 12 wherein said filtering arithmetic processing section executes the filtering arithmetic processing asynchronously with a predetermined sampling cycle.

14. A digital filter device as recited in claim 12 wherein said filtering arithmetic processing section executes the filtering arithmetic processing at a higher rate than a predetermined sampling rate.

15. A digital filter device as recited in claim 12 wherein said output section outputs the buffered filtered data in synchronism with a predetermined sampling cycle.

16. A digital filter device as recited in claim 12, wherein said output section buffers filtered data of the individual channels from said filtering arithmetic processing section while adding together the filtered data of the individual channels on a per-samples-point basis.

17. A digital filter device as recited in claim 12 wherein said interface section also receives, via the bus, a set of coefficients to be used in said filtering arithmetic processing section, and said filtering arithmetic processing section executes the filtering arithmetic processing using the set of coefficients received by said interface section.

18. A digital filter device as recited in claim 12 wherein said computer divides the digital data to be filtered into a plurality of frames and intermittently transfers, via the bus, digital data blocks, each comprising a plurality of samples of the digital data belonging to one of the frames, to said interface section, and when transferring the digital data of any one of the frames, said computer transfers, along with the digital data of the one frame, part of the digital data belonging to another of the frames adjoining the one frame, to thereby transfer a time series of the digital data consisting of a greater number of samples than a total number of samples contained in the one frame, and wherein said filtering arithmetic processing section executes the filtering arithmetic processing using said time series of the digital data consisting of a number of samples greater than a total number of samples contained in the one frame, to thereby provide filtered data corresponding to at least the total number of samples in the one frame.

19. A digital filter device as recited in claim 12 wherein said filtering arithmetic processing section executes the filtering arithmetic processing using a unique set of coefficients for each of the frames, and which further comprises an interpolating section that interpolates between filtered data of at least two adjoining frames outputted by said filtering arithmetic processing section.

20. A machine-readable medium containing a program for causing a processor to carry out a method of filtering processing for a plurality of channels, said processor operatively coupled to a bus of a computer, said computer collectively transferring, via the bus, a predetermined number of samples of digital data at one or more given time points within a predetermined frame period, said method of filtering comprising the steps of:

a first step of receiving the digital data transferred for each one of the plurality of channels from said computer via the bus;

a second step of executing predetermined filtering arithmetic processing, for at least one frame period, on the digital data received by said first step, the filtering arithmetic processing being executed intermittently in response to reception, by said first step, of the digital data via the bus; and a third step of buffering filtered data provided by said second step and then outputting the filtered data buffered thereby.

* * * * *